US008665498B2

(12) United States Patent
Jonsson et al.

(10) Patent No.: US 8,665,498 B2
(45) Date of Patent: Mar. 4, 2014

(54) METHOD AND SYSTEM FOR AUTOMATICALLY DETECTING AND PROCESSING HALFTONE REGIONS IN SCANNED DOCUMENTS

(75) Inventors: Ragnar H. Jonsson, Laguna Niguel, CA (US); Derek T. Walton, Bolton, MA (US)

(73) Assignee: Conexant Systems, Inc., Irvine, CA (US)

( * ) Notice: Subject to any disclaimer, the term of this patent is extended or adjusted under 35 U.S.C. 154(b) by 621 days.

(21) Appl. No.: 12/839,771

(22) Filed: Jul. 20, 2010

(65) Prior Publication Data
US 2012/0019869 A1    Jan. 26, 2012

(51) Int. Cl.
*H04N 1/405* (2006.01)
(52) U.S. Cl.
USPC ............................ 358/3.26; 358/3.15; 358/2.1
(58) Field of Classification Search
USPC ........ 358/1.9, 2.1, 1.13–1.17, 3.26, 524, 468, 358/3.15
See application file for complete search history.

(56) References Cited

U.S. PATENT DOCUMENTS

| 6,721,457 B1 | 4/2004 | Atkins et al. |
| 2004/0051908 A1 | 3/2004 | Curry et al. |
| 2008/0218803 A1 | 9/2008 | Murakami |
| 2009/0123085 A1 | 5/2009 | Yoshimura et al. |

OTHER PUBLICATIONS

European Patent Office; International Search Report and Written Opinion; PCT Application No. PCT/US2011/044559; Sep. 30, 2011.
Guleryuz, Onur G.; A Low Complexity Comprehensive Labeling and Enhancement Algorithm for Compound Documents; Mar. 11, 2003, 47 pgs.
The International Bureau of WIPO; International Preliminary Report on Patentability; PCT Application No. PCT/US2011/044559; Jan. 31, 2013.

*Primary Examiner* — Thomas D Lee
*Assistant Examiner* — Stephen M Brinich
(74) *Attorney, Agent, or Firm* — Jackson Walker L.L.P.; Christopher J. Rourk (57) ABSTRACT

A system for halftone processing is provided. The system includes a programmable halftone segmentation system having one or more programmable parameters to accommodate different input image parameters, such as different printer or scanner parameters, and configured to generate output control data as a function of image input data. A programmable output processor receives the output control data and the image input data and generates image output data that compensates for halftone regions in the image input data.

20 Claims, 5 Drawing Sheets

METHOD AND SYSTEM FOR AUTOMATICALLY DETECTING AND PROCESSING HALFTONE REGIONS IN SCANNED DOCUMENTS

FIELD OF THE INVENTION

The invention relates to image data processing, and more particularly to a method and system for automatically detecting and processing halftone regions in scanned documents.

BACKGROUND OF THE INVENTION

When printed material is digitally scanned and then printed again, the half-toning used in the original printing and the half-toning in the output print process can generate interference patterns (Moiré patterns) that significantly degrade the quality of the reproduced image.

SUMMARY OF THE INVENTION

A system for halftone processing is provided. The system includes a programmable halftone segmentation system having one or more programmable parameters to accommodate different input image parameters, such as different printer or scanner parameters, and configured to generate output control data as a function of image input data. A programmable output processor receives the output control data and the image input data and generates image output data that compensates for halftone regions in the image input data.

DETAILED DESCRIPTION OF PREFERRED EMBODIMENTS

In the description that follows, like parts are marked throughout the specification and drawings with the same reference numerals, respectively. The drawing figures might not be to scale and certain components can be shown in generalized or schematic form and identified by commercial designations in the interest of clarity and conciseness.

The disclosed embodiments generally use two processes for halftone detection and processing: halftone segmentation and output processing. Halftone segmentation segments the image into halftone areas, edges, and background areas (areas that are neither halftone nor edges). Different exemplary embodiments can be used to further classify edges into edges in halftone areas and other edges, or into smooth edges and sharp edges. The output processing processes the input image to enhance the appearance of the reproduced printed image. The output processing reduces or eliminates half-toning by using smoothing filters, while retaining or even enhancing the sharpness of edges.

In addition, the disclosed embodiments are well suited for hardware implementation, and can be tuned to adapt to different scanner and print engine quality.

The disclosed segmentation processing is based on edge detection in the input image and a low-pass (LP) filtered image. If the LP filtering is properly configured, it will smooth out all edges introduced by the half-toning process, while the input image has high concentration of edges introduced by the half-toning process. Therefore if a region of the image has a high concentration of edges in the input image, but little or no edges in the LP filtered image, that region is classified as a halftone region. In areas where the original image had edges before half-toning, these edges can be detected in the LP filtered image and in the input image, and such areas can be classified as edges. In areas with sharp contrast, such as black text on white background, the edge detection will report particularly strong edges, and such areas can be classified as strong- or sharp-edges.

This kind of classification into halftone, edge, and background regions can be done in blocks such that all the pixels in the block are assigned the same classification, or alternatively, the classification can be done on a pixel-by-pixel basis.

For color images it is possible to segment each color component separately, or color components can also or alternatively be combined into a luminance signal and the segmentation can be done using this luminance signal.

The output processing applies different processing to different areas of the images, based on how each area is classified. Areas that are classified as halftone areas are LP filtered to smooth out the half-toning screen. Areas that are classified as background areas can receive little or no LP filtering, such that they retain details in these background areas. Areas that are classified as edges can receive little or no LP filtering and sharp edges can receive high pass (HP) filtering, to enhance their sharpness.

On color images, the output processing can be done on each color component (e.g. red-green-blue, or "ROB") separately, and all color components can be processed the same way. It is also possible to process the output signal in luminance and chrominance format (e.g. a "YUV" format), in black-and-white, cyan-magenta-yellow ("CMG") or other standard or proprietary image data formats, which are generally referred to as color systems. Such color systems may have unique attributes. For example, for the YUV color system, the Y component can be processed differently than the U and V components, e.g. such that the Y component maintains the sharpness of edges while the U and V components are LP filtered more aggressively.

The halftone segmentation and the output processing consist of individual processing steps that are combined together. These processing steps can be combined differently to form the different variants of the algorithm, but the basic processing steps are mostly common to all the variants. Following is a short description of exemplary processing steps used in the halftone segmentation algorithms.

The segmentation processing can operate on luminance data, even if the input image is a color image. The luminance image can be generated using conventional RGB to YUV conversion on a pixel-by-pixel basis.

If the output processing is done in RGB domain, then there is no need for generating the U and V components and the generation of the luminance image can be simpler. For example, a simple weighted average of the RGB components can be generated using a suitable process.

Edge detection can be based on applying thresholds to the output of edge detection filters. The edge detection filters can be applied to the input (luminance) image, Y, to generate the edge enhanced image Ye. Likewise, the edge detection filters can be applied to the LP filtered (luminance) image, L, to generate the edge enhanced image, Le. The edge enhanced images can then be passed through edge thresholds for classification.

An alternative edge detection filter can be implemented using conventional linear edge enhancement filters. For example the filter in Table 1 can be used (followed by an absolute value operator) to enhance the edges. However, the use of such a filter might not provide as good performance as a max-min filter, discussed herein.

TABLE 1

Filter coefficients for edge detection filter

| | n | | |
|---|---|---|---|
| m | −1 | 0 | 1 |
| −1 | 1/8 | 1/8 | 1/8 |
| 0 | 1/8 | −1 | 1/8 |
| 1 | 1/8 | 1/8 | 1/8 |

The purpose of the output processing is to smooth halftone regions that can cause Moiré patterns in the printout, and to enhance edges for sharper reproduction of text. This is done by applying LP filtering to halftone regions and applying all-pass or high-pass filters to edges. In RGB based processing all the color components are typically filtered the same way. In YUV based processing, the luminance signal Y is typically processed differently than the chrominance signals U and V.

Output filtering can use alpha values to control the frequency response of the output filter from low-pass, to all-pass, or even high-pass. This can be implemented as:

$$Y[m,n] = x[m,n] * h_1[m,n](1-\alpha) + x[m,n] * h_2[m,n]\alpha$$

where $h_1[m,n]$ is an LP filter designed to smooth out halftone masks and $h_2[m,n]$ is a filter designed such that the background looks good for alpha=1 and edges are sufficiently sharp for alpha>1. For 600×600 dpi image, the filter $h_1[m,n]$ can be a separable 11×11 filter where the 1-D horizontal and vertical filters are given in Table 2 below. The filter $h_2[m,n]$ can be an all-pass filter (i.e., no filter applied), an LP filter, an HP filter or other suitable filters, depending on what works best with the target print process.

By choosing a value of alpha that is sufficiently large for edges, output processing can generate reasonably sharp edges. One problem with this approach is that high-pass filtering of edges can enhance color fringing at the edges. This in turn can cause color patches to appear around sharp edges, which in turn makes the edges look slightly fuzzy and not as sharp as they could be.

One way to address this problem is to perform special processing at the edges that reduces color at sharp edges and therefore does not enhance the color fringing. This can be accomplished by calculating the output as:

$$Y[m,n] = y_1[m,n](1-\beta) + (2Y[m,n] - L[m,n])\beta$$

where $y_1[m,n]$ is calculated as set forth above and beta is derived from alpha such that beta is close to one for sharp edges and zero otherwise. The luminance signals Y and L can be the same for all the RGB color components and the output can become monochrome at sharp edges where beta is equal to one.

Figure 1A:
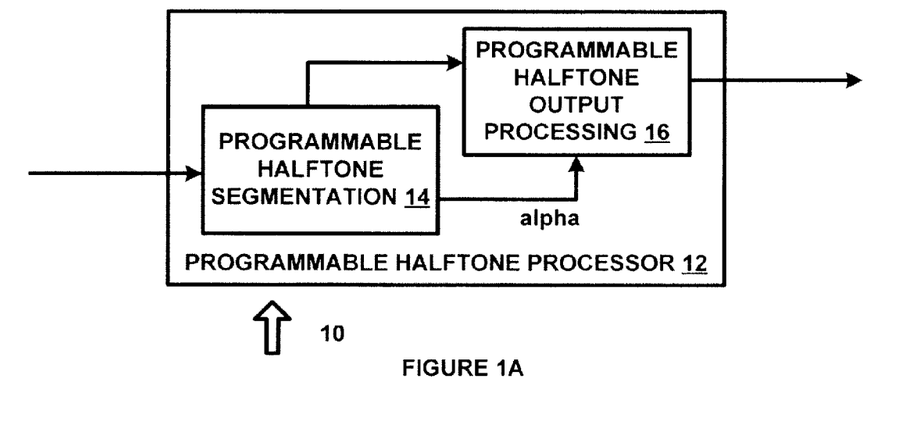
FIG. 1A is a diagram of a system for programmable halftone processing in accordance with an exemplary embodiment of the present invention.

FIG. 1A is a diagram of a system 10 for programmable halftone processing in accordance with an exemplary embodiment of the present invention. System 10 can be implemented in hardware or a suitable combination of hardware and software, and can be one or more software systems operating on a processing platform. As used herein, "hardware" can include a combination of discrete components, an integrated circuit, an application-specific integrated circuit, a field programmable gate array, a digital signal processor, or other suitable hardware. As used herein, "software" can include one or more objects, agents, threads, lines of code, subroutines, separate software applications, one or more lines of code or other suitable software structures operating in one or more software applications or on one or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

System 10 includes programmable halftone processor 12, which can include programmable halftone segmentation 14 and programmable halftone output processing 16, which are used to allow printed material that has been scanned to form an image data file to be subsequently printed without the generation of image defects such as Moiré patterns. Because the generation of image defects and artifacts can result from differences in halftoning used to print the original image that has been scanned in and the subsequent image that is printed from the scanned image, it is necessary to provide for programmable halftone processing and output processing to compensate for different printer halftone processing. System 10 thus allows different printers to be compensated for to eliminate image artifacts.

Figure 1B:
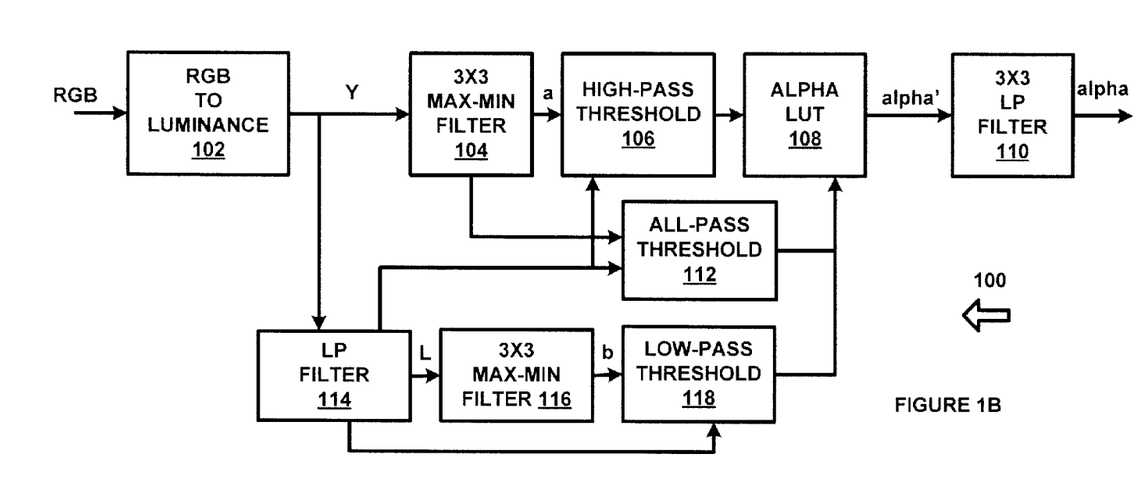
FIG. 1B is a diagram of a system for halftone processing in accordance with an exemplary embodiment of the present invention.

FIG. 1B is a diagram of a system 100 for halftone processing in accordance with an exemplary embodiment of the present invention. System 100 can be used for halftone segmentation processing and other suitable processes, and can be implemented in hardware or a suitable combination of hardware and software.

System 100 includes RGB to luminance conversion system 102, which can prepare a simple weighted average of red, green and blue components or other suitable data. In one exemplary embodiment, RGB to luminance conversion system 102 can implement the following algorithm:

$$Y = \frac{R + 2G + B}{4}$$

Where
Y=luma component for a pixel
R=red color component for a pixel

G=green color component for a pixel

B=blue color component for a pixel

Likewise, other suitable processes for converting color component values to luminance component values can also or alternatively be used.

LP filter 114 can be implemented as a programmable 11×11 separable filter or in other suitable manners to provide low pass filtering of the input (luminance) image. LP filter 114 can be implemented using separable filtering without any noticeable loss in performance. For example, for 600×600 DPI resolution images, LP filter 114 can be an 11×11 filter, but 9×9 filters or other smaller filters can be sufficient. Using smaller filters can potentially degrade the classification of halftone areas with 100-110 LPI screens. In one exemplary embodiment, the segmentation process LP filter can be a Gaussian filter with variance of around 3.0. Table 2 lists filter coefficients for an exemplary 1-D filter that can be used for separable implementation of an 11×11 LP filter, but LP filter 114 can be tuned to provide optimal processing based on different scanner and print engine parameters, such as by receiving data that defines a scanner and print engine and selecting suitable filter coefficients, by auto detection of settings, or in other suitable manners.

TABLE 2

1-D filter coefficients for 11 × 11 separable segmentation LP filter

| n | h[n] |
|---|---|
| −5 | 3/256 |
| −4 | 8/256 |
| −3 | 18/256 |
| −2 | 31/256 |
| −1 | 43/256 |
| 0 | 49/256 |
| 1 | 43/256 |
| 2 | 31/256 |
| 3 | 18/256 |
| 4 | 8/256 |
| 5 | 3/256 |

For edge detection, 3×3 Max-Min filters 104 and 116 are used to enhance edges and suppress areas without edges. In one exemplary embodiment, 3×3 Max-Min filters 104 and 116 use 3×3 blocks of pixels around each pixel that is being processed. The maximum and the minimum value are found within each such block, and the output generated by 3×3 Max-Min filters 104 and 116 is the difference between the maximum and minimum. This process can equivalently be implemented as a difference of mathematical morphology erosion and dilation operations, with 3×3 structural elements, or in other suitable manners.

The threshold values for high-pass threshold 106, all-pass threshold 112 and low-pass threshold 118 can be taken from separate look-up tables on a pixel-by-pixel basis. The index into all three threshold look-up tables can be the four most significant bits of the low-pass filtered luminance signal, L. In one exemplary embodiment, default values in edge threshold look-up table 3 or other suitable values can be used. Edge threshold look-up tables can be tuned to provide optimal processing based on different scanner and print engine parameters, such as by receiving data that defines a scanner and print engine and selecting suitable filter coefficients, by auto detection of settings, or in other suitable manners

TABLE 3

Default values for edge threshold values

| L[7:4] | LP-Thr | AP-Thr | HP-Thr |
|---|---|---|---|
| 0 | 8/256 | 13/256 | 114/256 |
| 1 | 8/256 | 13/256 | 114/256 |
| 2 | 10/256 | 16/256 | 114/256 |
| 3 | 10/256 | 16/256 | 114/256 |
| 4 | 12/256 | 19/256 | 133/256 |
| 5 | 12/256 | 19/256 | 152/256 |
| 6 | 15/256 | 24/256 | 152/256 |
| 7 | 15/256 | 24/256 | 152/256 |
| 8 | 15/256 | 24/256 | 152/256 |
| 9 | 15/256 | 24/256 | 152/256 |
| 10 | 12/256 | 19/256 | 152/256 |
| 11 | 12/256 | 19/256 | 133/256 |
| 12 | 10/256 | 16/256 | 133/256 |
| 13 | 10/256 | 16/256 | 114/256 |
| 14 | 8/256 | 13/256 | 114/256 |
| 15 | 8/256 | 13/256 | 114/256 |

The pixel values from the low-pass filtered image can be used to select a threshold value for each pixel. Two, three or other suitable numbers of threshold look-up tables can be used, depending on the process being utilized. A low-pass threshold look-up table can be applied to an edge enhanced low-pass signal Le. If the Le value for the pixel is above the threshold value for the pixel, that pixel can be classified as Low-Pass Edge (LPE). Similarly, a look-up table all-pass threshold 112 can be applied to an edge enhanced input image Ye, and if the Ye value for a given pixel is above the threshold value for that pixel, the pixel can be classified as an All-Pass Edge (APE). Classification of pixels into LPE and APE is not required to be mutually exclusive, and can be used together to classify each pixel into halftone, edge, or background. In one exemplary embodiment, if a pixel is APE, but not LPE, then it can be classified as a halftone area pixel. In another exemplary embodiment, if a pixel is APE and LPE, then it can be classified as being an edge pixel. In yet another exemplary embodiment, if a pixel is not an APE, it can be classified as a background pixel. In some variants of the processing, a third threshold value, the high-pass threshold, can also applied to the edge enhanced input image, Ye, to detect High-Pass Edges (HPE). Pixels that are classified as HPE are on sharp-edges, such as black text on a white background. The output of the edge threshold processing is a 3-bit value that can used as index into alpha look-up table 108, on a pixel-by-pixel basis.

The pixel classification into LPE, APE, and/or HPE can be used to control the output processing for each pixel. In one exemplary embodiment, the pixel classifications are combined into a three bit word [HPE APE LPE] that is used as an index into a look-up table containing "alpha values" that control the output processing. This way an alpha value is generated for each image pixel. The alpha image is then LP filtered with a 3×3 filter to generate a slightly smoother alpha map, to enhance the appearance of the final output image.

In exemplary variants of the process, the HPE classification is not performed and only two bits APE and LPE are used for the alpha look-up. This simplifies the process but does not give as good performance. In other exemplary variants of the algorithm, a second parameter beta can be generated based on alpha or directly from LPE, APE, and/or HPE. This parameter can be used in the output processing to provide special enhancement of sharp edges.

In variants of the process that use YUV-based output processing, the alpha values for the luminance and the chrominance can be different. In this case they can be constructed independently directly from the LPE, APE, and HPE values or in other suitable manners.

In some variants of the process, the output processing may need more than a single alpha value. In this case the LPE, APE, and HPE values are used to index more than one look-up table to generate multiple alpha values. These alpha values may or may not be LP filtered before being used to control the output processing.

Alpha look-up table 108 can include values that are filtered with a 3×3 non-separable filter to generate the output value of the segmentation processing. In one exemplary embodiment, default values for alpha look-up table 108 provided in Table 4 or other suitable values can be used. Alpha look-up table 108 can be tuned to provide optimal processing based on different scanner and print engine parameters, such as by receiving data that defines a scanner and print engine and selecting suitable filter coefficients, by auto detection of settings, or in other suitable manners

TABLE 4

Default values for alpha look-up table

| N (HLA) | alpha | Area Type |
|---|---|---|
| 0 (000) | 1 | Background |
| 1 (001) | 0 | Halftone |
| 2 (010) | 1 | N/A |
| 3 (011) | 3 | Halftone Edge |
| 4 (100) | 1 | N/A |
| 5 (101) | 0 | Halftone |
| 6 (110) | 1 | N/A |
| 7 (111) | 5 | Sharp Edge |

The optimum values for alpha look-up table 108 can depend on the scanner properties and the properties of the print process. For 600×600 dpi images from a good scanner for printing with a good print engine, the values in Table 3 are suitable.

The filter coefficients for LP filter 114, high-pass threshold 106, all-pass threshold 112, low-pass threshold 118, and alpha look-up table 108 can be programmable, such as where a predetermined memory location is used for each table value and is modified as needed.

Figure 2:
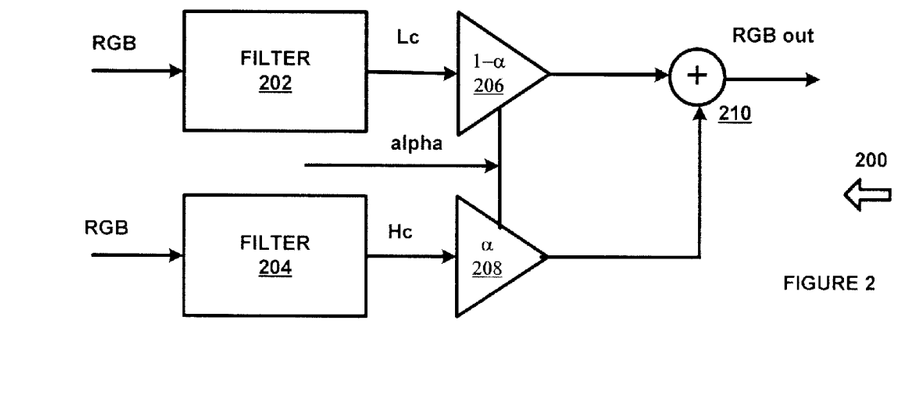
FIG. 2 is a diagram of a system for output processing in accordance with an exemplary embodiment of the present invention.

FIG. 2 is a diagram of a system 200 for output processing in accordance with an exemplary embodiment of the present invention. System 200 can be implemented in hardware or a suitable combination of hardware and software.

System 200 can be used to process each color component (red, green and blue) independently or in other suitable manners. Filter 202 can be implemented as a programmable 11×11 separable filter, and filter 204 can also be implemented as programmable 11×11 separable filter, although a smaller filter such as a 5×5 filter can be sufficient in some applications. Processing by 1−α gain unit 206, α gain unit 208 and summation unit 210 can be performed on a pixel-by-pixel basis, or in other suitable manners. The values of α (alpha) used in 1−α gain unit 206 and α gain unit 208 can be based on halftone segmentation processing, such as in the manner previously discussed for alpha look-up table 108. The coefficients of filter 202 and filter 204 can be programmable where suitable. For 600×600 dpi images, default values for the coefficients of filter 202 can be provided by Table 2, and default values for the coefficients of filter 204 can be provided in Table 5 (which is a 7×7 separable filter that can also be utilized as a special application for an 11×11 filter). Filters 202 and 204 can be tuned to provide optimal processing based on different scanner and print engine parameters, such as by receiving data that defines a scanner and print engine and selecting suitable filter coefficients, by auto detection of settings, or in other suitable manners

TABLE 5

1-D filter coefficients for 11 × 11 separable filter

| n | h[n] |
|---|---|
| −5 | 0/256 |
| −4 | 0/256 |
| −3 | 2/256 |
| −2 | 16/256 |
| −1 | 62/256 |
| 0 | 96/256 |
| 1 | 62/256 |
| 2 | 16/256 |
| 3 | 2/256 |
| 4 | 0/256 |
| 5 | 0/256 |

Figure 3:
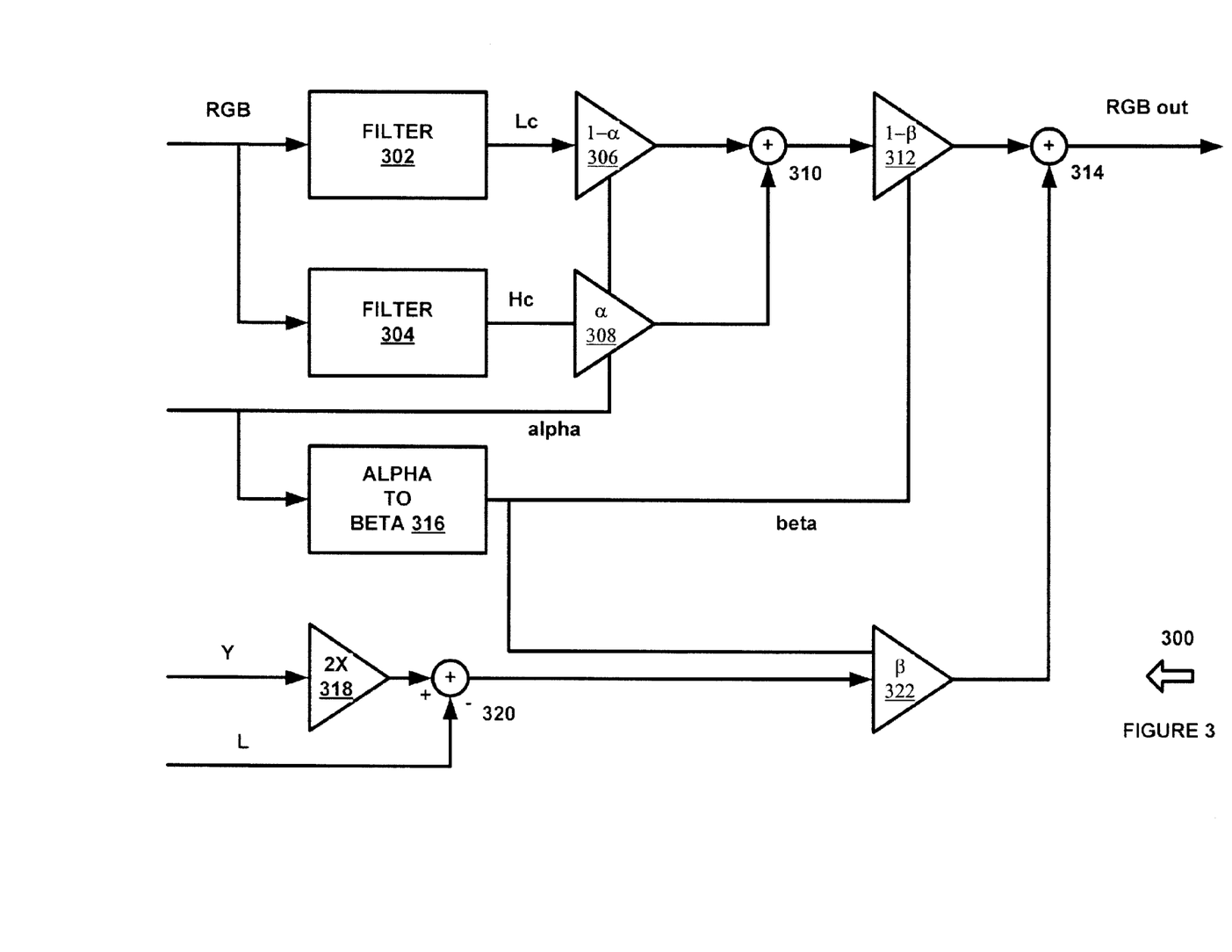
FIG. 3 is a diagram of a system for output processing in accordance with an exemplary embodiment of the present invention.

FIG. 3 is a diagram of a system 300 for output processing in accordance with an exemplary embodiment of the present invention. System 300 can be implemented in hardware or a suitable combination of hardware and software.

As previously discussed, each color component (red, green and blue) can be processed independently. In one exemplary embodiment, filter 302 can be implemented as programmable 11×11 separable filter, and filter 304 can be implemented as a programmable 11×11 separable filter, although a 5×5 filter can be sufficient. Processing by 1−α gain unit 306, a gain unit 308 and summation unit 310 can be performed on a pixel-by-pixel basis.

In one exemplary embodiment, alpha-to-beta conversion for gain 1−β and β gain 322 can be determined based on the following relationship:

$$\text{beta} = \min(1, \max(0, \text{alpha} - \text{ref\_alpha}))$$

The Y and L signals can be combined to create a high-pass filtered luminance signal, which can be the same for all of the red, green and blue color components, and the beta gains and summation 314 can be performed on a pixel-by-pixel basis.

As previously discussed, the alpha values can be determined from the halftone segmentation processing, and the Y and L signals can be the same luminance signals as used in the halftone segmentation processing. The value of ref_alpha can be programmable, and a default value of 4 can be used. The coefficients of filters 302 and 304 can be programmable. For 600×600 dpi images, suitable default values for the coefficients of filter 302 can be obtained from Table 2 (which is a 5×5 filter that can also be utilized as a special application of an 11×11 filter), whereas suitable default values for the coefficients of filter 304 can be obtained from Table 6. Filters 302 and 304 can be tuned to provide optimal processing based on different scanner and print engine parameters, such as by receiving data that defines a scanner and print engine and selecting suitable filter coefficients, by auto detection of settings, or in other suitable manners

TABLE 6

1-D filter coefficients for 11 × 11 separable filter

| n | h[n] |
|---|---|
| −5 | 0/256 |
| −4 | 0/256 |
| −3 | 0/256 |
| −2 | 16/256 |
| −1 | 63/256 |
| 0 | 98/256 |
| 1 | 63/256 |
| 2 | 16/256 |
| 3 | 0/256 |

TABLE 6-continued

1-D filter coefficients for 11 × 11 separable filter

| n | h[n] |
|---|------|
| 4 | 0/256 |
| 5 | 0/256 |

Exemplary default coefficients for alpha can be determined from Table 7:

TABLE 7

Default values for alpha

| N (HLA) | alpha | Area Type |
|---------|-------|-----------|
| 0 (000) | 1 | Background |
| 1 (001) | 0 | Halftone |
| 2 (010) | 1 | N/A |
| 3 (011) | 3 | Halftone Edge |
| 4 (100) | 1 | N/A |
| 5 (101) | 0 | Halftone |
| 6 (110) | 1 | N/A |
| 7 (111) | 6 | Sharp Edge |

Figure 4:
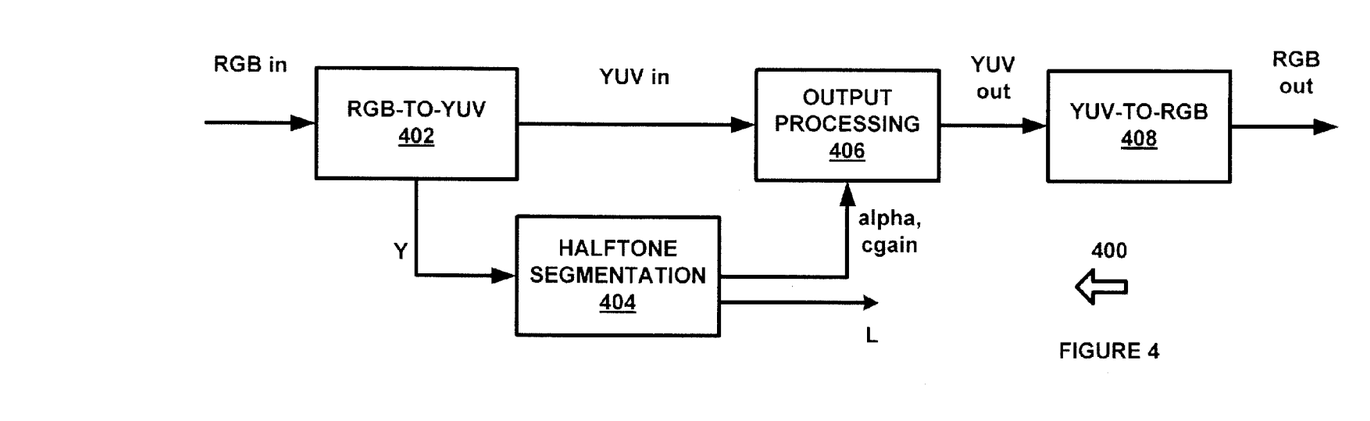
FIG. 4 is a diagram of a system for halftone processing in accordance with an exemplary embodiment of the present invention.

FIG. 4 is a diagram of a system 400 for halftone processing in accordance with an exemplary embodiment of the present invention. System 400 can be implemented in hardware or a suitable combination of hardware and software.

System 400 performs output processing in a luminance-chrominance (YUV) domain, rather than an ROB domain. Halftone segmentation processing in the YUV domain can be similar to processing in the RGB domain, but output processing can be different, because all the processing is done using YUV representation, which can reduce the computational load of the algorithm and can provide additional flexibility in processing the luminance component differently than the chrominance components. Processing in the YUV domain can be more complicated than processing in the RGB domain, and can result in a larger circuit size for silicon-implement embodiments.

System 400 includes RGB-to-YUV conversion 402, which can implement a suitable conversion algorithm, such as:

$$\begin{bmatrix} Y \\ U \\ V \end{bmatrix} = T \begin{bmatrix} R \\ G \\ B \end{bmatrix}$$

T can be a suitable 3×3 color conversion matrix, such as:

$$T = \begin{bmatrix} 0.299 & 0.587 & 0.114 \\ -0.146 & -0.288 & 0.434 \\ 0.617 & -0.517 & -0.100 \end{bmatrix}$$

Other color conversion processes can be used, including but not limited to the NTSC YIQ conversion and the YCbCr conversion. The Y component can then be used in halftone segmentation 404, and all three YUV components can be used in output processing 406. A low-pass filter luminance signal, L, can be reused in the output processing to reduce computational complexity.

Figure 5:
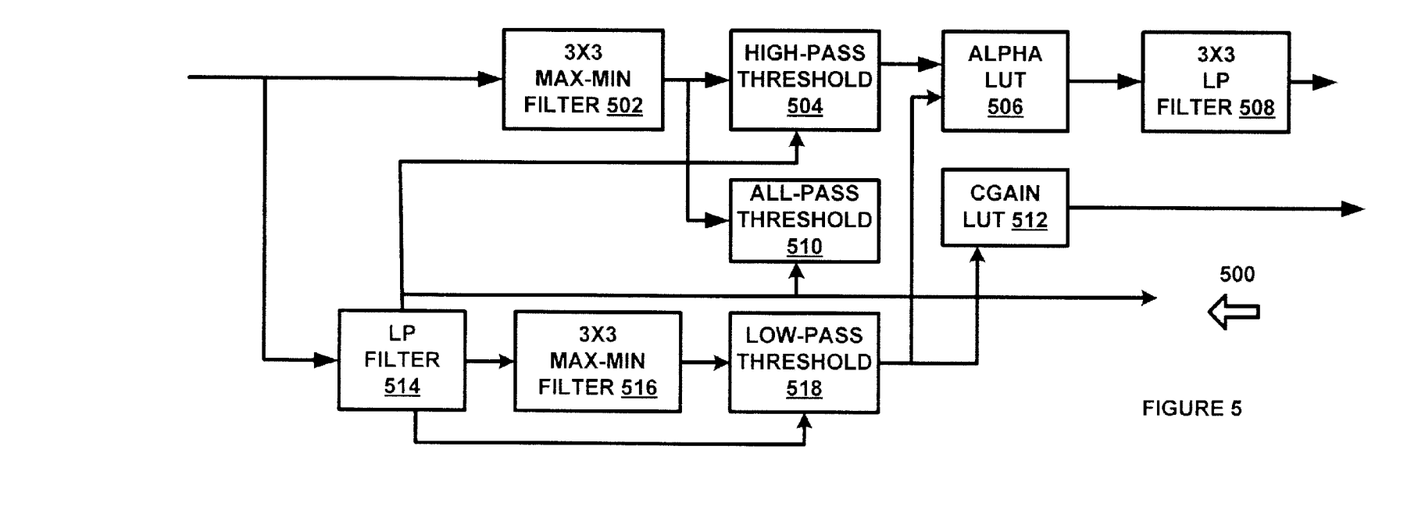
FIG. 5 is a diagram of a system for halftone segmentation in accordance with an exemplary embodiment of the present invention.

FIG. 5 is a diagram of a system 500 for halftone segmentation in accordance with an exemplary embodiment of the present invention. Because halftone segmentation utilizes the Y signal from the ROB-to-YUV conversion, there is no need for the RGB-to-Luminance conversion stage in system 500. In addition to the alpha values, two chrominance gain values can be generated for each pixel, which uses cgain look-up table 512 with output vectors of length two. The cgain values are not low-pass filtered, such as in the manner that alpha values are low-pass filtered. Table 7 can be used to provide default values for alpha and Table 8 can be used to provide default values for again. Cgain look-up table 512 can be tuned to provide optimal processing based on different scanner and print engine parameters, such as by receiving data that defines a scanner and print engine and selecting suitable filter coefficients, by auto detection of settings, or in other suitable manners

TABLE 8

Default "cgain" values

| N (HLA) | cg1 | cg2 | Area Type |
|---------|-----|-----|-----------|
| 0 (000) | 16/16 | 0/16 | Background |
| 1 (001) | 0/16 | 16/16 | Halftone |
| 2 (010) | 16/16 | 0/16 | N/A |
| 3 (011) | 0/16 | 12/16 | Halftone Edge |
| 4 (100) | 16/16 | 0/16 | N/A |
| 5 (101) | 0/16 | 16/16 | Halftone |
| 6 (110) | 16/16 | 0/16 | N/A |
| 7 (111) | 0/16 | 0/16 | Sharp Edge |

Because the low-pass filtered luminance signal, L, is reused in the output processing, the filter coefficients in filter 514 can be chosen with this dual purpose in mind. In both cases the purpose of the low-pass filtering is to smooth out halftone areas that would cause Moiré patterns in the reproduced image. The filter coefficient values of Table 2 can be used as good default values for 600×600 dpi images.

Figure 6:
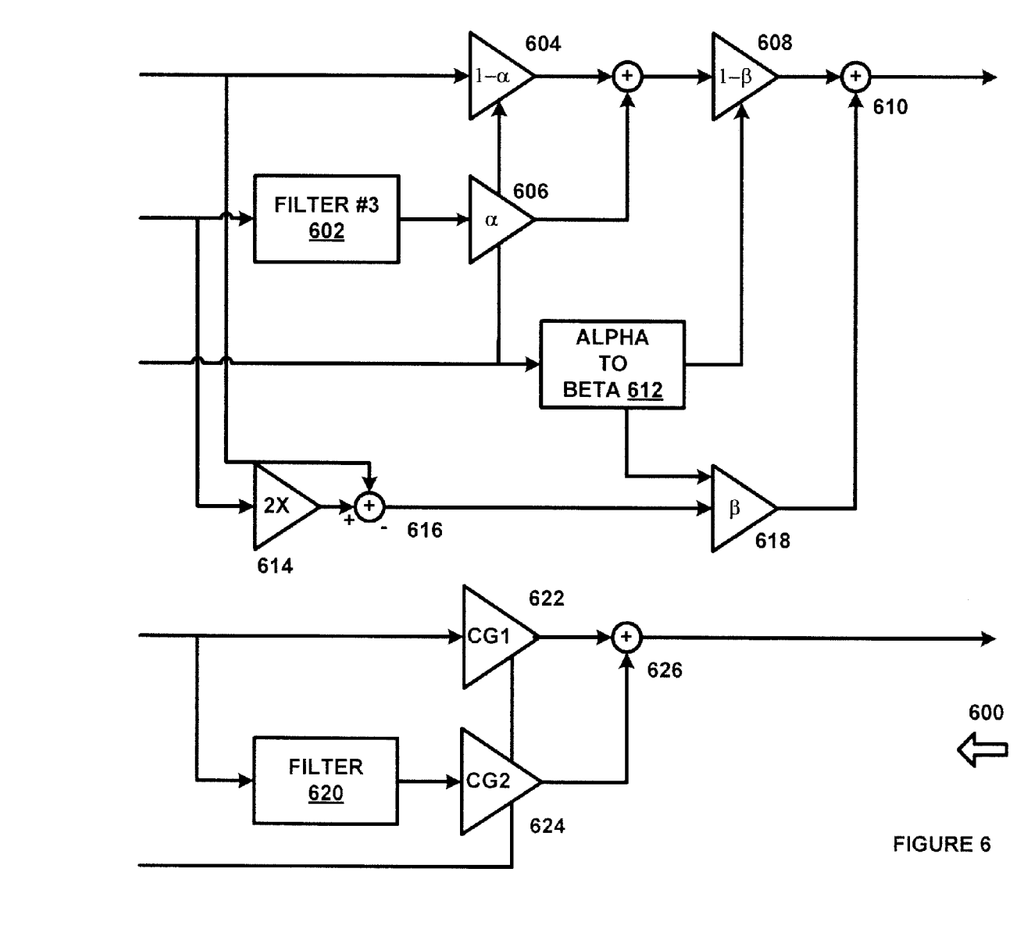
FIG. 6 is a diagram of a system for output processing in accordance with an exemplary embodiment of the present invention.

FIG. 6 is a diagram of a system 600 for output processing in accordance with an exemplary embodiment of the present invention. System 600 can be implemented in hardware or a suitable combination of hardware and software.

System 600 processes the luminance component in a manner that is similar to the output processing for the RGB components of system 300, except that filter 302 has been eliminated and the output of LP filter 114 is used instead. The U and V signals are independently processed by filter 620, which can be an 11×11 separable filter. The filtered signal and the input signal are then summed together at summer 626 after applying gain values CG1 622 and CG2 624 to them, respectively.

Because the output of LP filter 114 is used in the output processing and simpler processing is used for the U and V components, system 600 has lower computational complexity than other systems. Using different processing for luminance and chrominance also adds to the flexibility of system 600. The drawback is that system 600 has a more complicated structure.

Figure 7:
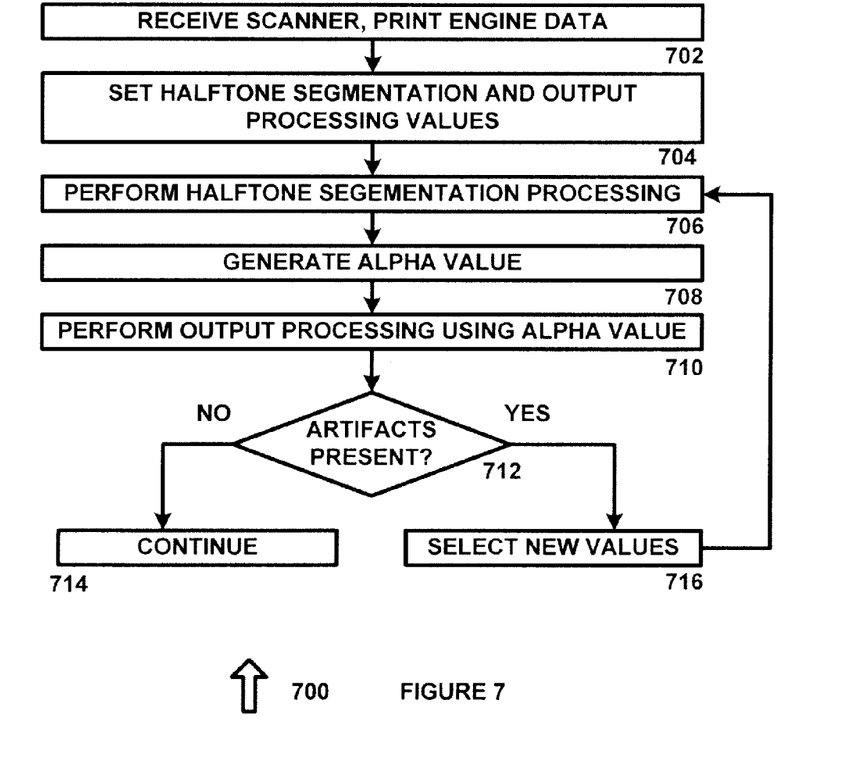
FIG. 7 is a diagram of an algorithm for performing halftone processing in accordance with an exemplary embodiment of the present invention.

FIG. 7 is a diagram of an algorithm 700 for performing halftone processing in accordance with an exemplary embodiment of the present invention. Algorithm 700 can be implemented in code on a general purpose processor or other suitable computing platforms.

Algorithm 700 begins at 702, where scanner data, print engine data or other suitable data is received. In one exemplary embodiment, the scanner data and print engine data can be determined by analyzing image data, can be received from scanner or print engine identification data, can be entered by a user directly, can be looked up from a table of scanner and print engine data values, or can otherwise be suitably obtained. The algorithm then proceeds to 704.

At 704, halftone segmentation and output processing values are set, such as by setting filter look-up table values, edge detection values, cgain values, alpha values or other suitable values as a function of scanner or print engine variables. The algorithm then proceeds to 706.

At 706, halftone segmentation processing is performed, such as to segment the image into halftone areas, edges and background areas that are neither halftone nor edges. Additional processing can further classify edges, such as edges that are in halftone areas, smooth edges, sharp edges, or other suitable edges. Processing can be performed on individual pixels, groups of pixels or in other suitable manners. The algorithm then proceeds to 708.

At 708, alpha values are generated, such as to identify whether a pixel or group of pixels are edges, background, halftone, halftone edges, sharp edges, or other suitable classifications. In addition or alternatively, beta, cg, cg2 or other suitable image data processing values can be generated and utilized. The algorithm then proceeds to 710, where output processing is performed using the alpha values. The algorithm then proceeds to 712.

At 712, it is determined whether artifacts, such as moiré patterns, are present in an image that is printed from a scanned image. Artifacts can be detected using image processing, from user input, or in other suitable manners. If it is determined that artifacts are present, the algorithm proceeds to 716 where new values are selected for filter look-up table values, edge detection values, cgain values, alpha values or other suitable values. The algorithm them returns to 706. Likewise, if it is determined at 712 that artifacts are not present, the algorithm proceeds to 714 where processing is continued.

In operation, algorithm 700 allows parameters that are used for halftone processing to be programmed and adjusted to compensate for printer and scanner characteristics that can create image artifacts during repeated printing and scanning processes. Algorithm 700 thus allows different printers and scanners to be accommodated for.

Variable gamma values can also be use to apply higher gamma value at edges than in the rest of the image, to enhance the sharpness of edges, although color fringing may also be more visible in certain conditions.

Median filtering or other rank-order filters for smoothing around edges can also be applied, but may complicate the hardware implementation.

A variable filter geometry at edges can also be utilized, to apply an LP filters along the edge and HP filters across the edge. Such filtering is configured to change orientation with the direction of the edge, which can complicate implementation in HW.

While certain exemplary embodiments have been described in detail and shown in the accompanying drawings, it is to be understood that such embodiments are merely illustrative of and not restrictive on the broad invention. It will thus be recognized to those skilled in the art that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and the spirit of the invention defined by the appended claims.

What is claimed is:

1. A system for halftone processing comprising:
    a programmable halftone segmentation system having one or more programmable parameters to accommodate different input image parameters and configured to generate output control data as a function of image input data; and
    a programmable output processor for receiving the output control data and the image input data and generating image output data that compensates for halftone regions in the image input data, wherein the programmable halftone segmentation system comprises a plurality of programmable edge look-up tables, each configured to receive edge threshold values and to apply filter values based on one or more of a low, medium or high edge threshold values.

2. The system of claim 1 wherein the programmable halftone segmentation system comprises:
    a red-green-blue to luminance conversion system configured to convert red pixel data values, green pixel data values and blue pixel data values into luminance data values;
    a max-min filter coupled to the red-green-blue to luminance conversion system; and
    a low pass filter coupled in to the red-green-blue to luminance conversion system in parallel with the max-min filter.

3. The system of claim 2 wherein the programmable halftone segmentation system further comprises a second max-min filter coupled to the low-pass filter for receiving pixel values and configured to generate an output based on a maximum pixel value and a minimum pixel value.

4. The system of claim 2 wherein the programmable halftone segmentation system comprises a high-pass edge threshold filter coupled to the max-min filter and configured to generate high-pass edge threshold values.

5. The system of claim 1 wherein the programmable output processor comprises a programmable filter configured to filter the image input data by applying 1-D filter coefficients for an 11×11 separable filter and to output halftone processed image data.

6. The system of claim 1 wherein the programmable output processor comprises a programmable gain stage to apply a programmable gain to the image input data by applying alpha coefficients and to output halftone processed image data in accordance with:

$$Y[m,n]=x[m,n]*h_1[m,n](1-\alpha)+x[m,n]*h_2[m,n]\alpha,$$

where
$h_1[m,n]$ is a low pass filter and
$h_2[m,n]$ is a filter for emphasizing a background for alpha=1 and for emphasizing edges for alpha>1.

7. The system of claim 1 wherein the programmable halftone segmentation system comprises a red-green-blue to luminance and chrominance conversion system configured to convert red pixel data values, green pixel data values and blue pixel data values into luminance data values and chrominance data values by applying chrominance gain coefficients.

8. The system of claim 7 wherein the programmable output processor comprises a programmable chrominance gain stage for applying a programmable chrominance gain to the chrominance data and outputting compensated chrominance data values.

9. The system of claim 1 wherein the programmable halftone segmentation system comprises a red-green-blue to luminance conversion system configured to convert red pixel data values, green pixel data values and blue pixel data values into luminance data values.

10. The system of claim 1 wherein the programmable halftone segmentation system comprises a max-min filter coupled to the red-green-blue to luminance conversion system.

11. The system of claim 1 wherein the programmable halftone segmentation system comprises a low pass filter coupled in to the red-green-blue to luminance conversion system in parallel with the max-min filter.

12. A system for halftone processing comprising:
a programmable halftone segmentation system having one or more programmable parameters to accommodate different input image parameters and configured to generate output control data as a function of image input data, wherein the programmable halftone segmentation system comprises:
  a red-green-blue to luminance conversion system for converting red pixel data values, green pixel data values and blue pixel data values into pixel luminance data values;
  a max-min filter for receiving the pixel luminance data values and generating an output pixel value based on a maximum pixel luminance data value and a minimum pixel luminance data value in the vicinity of a selected pixel;
  a programmable low-pass filter for receiving the output pixel value and generating low-pass edge threshold values;
  a programmable high-pass filter for receiving the output pixel value and generating high-pass edge threshold values;
  a programmable all-pass filter for receiving the output pixel value and generating all-pass edge threshold values; and
  a programmable edge look-up table for receiving the low-pass edge threshold values, the high-pass edge threshold values and the all-pass edge threshold values and applying filter values based on the low-pass edge threshold values, the high-pass edge threshold values and the all-pass edge threshold values to generate the output control data; and
a programmable output processor receiving the output control data and the image input data and generating image output data that compensates for halftone regions in the image input data, wherein the programmable output processor comprises a programmable filter for filtering the image input data and outputting halftone processed image data, wherein the programmable output processor comprises:
  a programmable gain stage for applying a programmable gain to the image input data and outputting halftone processed image data.

13. A system for halftone processing comprising:
a programmable halftone segmentation system having one or more programmable parameters to accommodate different input image parameters and configured to generate output control data as a function of image input data; and
a programmable output processor for receiving the output control data and the image input data and generating image output data that compensates for halftone regions in the image input data, wherein the programmable halftone segmentation system comprises a red-green-blue to luminance and chrominance conversion system configured to convert red pixel data values, green pixel data values and blue pixel data values into luminance data values and chrominance data values by applying chrominance gain coefficients.

14. The system of claim 13 wherein the programmable halftone segmentation system comprises:
a red-green-blue to luminance conversion system configured to convert red pixel data values, green pixel data values and blue pixel data values into luminance data values;
a max-min filter coupled to the red-green-blue to luminance conversion system; and
a low pass filter coupled in to the red-green-blue to luminance conversion system in parallel with the max-min filter.

15. The system of claim 14 wherein the programmable halftone segmentation system further comprises a second max-min filter coupled to the low-pass filter for receiving pixel values and configured to generate an output based on a maximum pixel value and a minimum pixel value.

16. The system of claim 14 wherein the programmable halftone segmentation system comprises a high-pass edge threshold filter coupled to the max-min filter and configured to generate high-pass edge threshold values.

17. The system of claim 13 wherein the programmable halftone segmentation system comprises a plurality of programmable edge look-up tables.

18. The system of claim 13 wherein the programmable output processor comprises a programmable filter configured to filter the image input data by applying 1-D filter coefficients for an 11×11 separable filter and to output halftone processed image data.

19. The system of claim 13 wherein the programmable output processor comprises a programmable gain stage to apply a programmable gain to the image input data by applying alpha coefficients and to output halftone processed image data in accordance with:

$$Y[m,n]=x[m,n]*h_1[m,n](1-\alpha)+x[m,n]*h_2[m,n]\alpha,$$

where
$h_1[m,n]$ is a low pass filter and
$h_2[m,n]$ is a filter for emphasizing a background for alpha=1 and for emphasizing edges for alpha>1.

20. The system of claim 13 wherein the programmable output processor comprises a programmable chrominance gain stage for applying a programmable chrominance gain to the chrominance data and outputting compensated chrominance data values.

\* \* \* \* \*